US012566686B2

(12) United States Patent
Sawal et al.

(10) Patent No.: US 12,566,686 B2
(45) Date of Patent: Mar. 3, 2026

(54) GRAPH EMBEDDINGS FOR DRIFT IDENTIFICATION

(71) Applicant: Dell Products L.P., Round Rock, TX (US)

(72) Inventors: Vinay Sawal, Fremont, CA (US); Jason Liu, Wellesley, MA (US); Chris Atkinson, Woodstock, GA (US); Kirk Frey, Fleminton, NJ (US); Elie Antoun Jreij, Pflugerville, TX (US); Amihai Savir, Newton, MA (US); Jacob R. Hutcheson, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 58 days.

(21) Appl. No.: 18/764,067

(22) Filed: Jul. 3, 2024

(65) Prior Publication Data

US 2026/0010451 A1     Jan. 8, 2026

(51) Int. Cl.
*G06F 11/30* (2006.01)
*G06F 16/901* (2019.01)

(52) U.S. Cl.
CPC ...... *G06F 11/3051* (2013.01); *G06F 16/9024* (2019.01)

(58) Field of Classification Search
None
See application file for complete search history.

(56) References Cited

U.S. PATENT DOCUMENTS

| | | | | | |
|---|---|---|---|---|---|
| 12,294,492 | B1 * | 5/2025 | Sawal | ............... | H04L 41/082 |
| 2022/0239555 | A1 * | 7/2022 | Bhosle | ............... | H04L 41/082 |
| 2022/0391113 | A1 * | 12/2022 | Perneti | ............... | G06F 3/0632 |
| 2024/0346078 | A1 * | 10/2024 | Shin | ............... | G06T 11/001 |

(Continued)

OTHER PUBLICATIONS

"Graph Isomorphism Network." [https://paperswithcode.com/method/gin], Jul. 20, 2024, retrieved via The Wayback Machine [https://web.archive.org/web/20240720140300/https://paperswithcode.com/method/gin] retrieved on Sep. 2, 2025, 3 pages.

(Continued)

*Primary Examiner* — June Sison
(74) *Attorney, Agent, or Firm* — Amin, Turocy & Watson, LLP

(57) ABSTRACT

A system can create a first graph that represents first values of current configurations of a computer hardware as first nodes and first dependencies of the current configurations as first links. The system can create first embedding vectors based on the first graph. The system can input the first embedding vectors to a graph isomorphism network to produce modified first embedding vectors. The system can identify specified configurations for the computer hardware. The system can create a second graph that represents second values of the specified configurations. The system can create second embedding vectors based on the second graph. The system can input the second embedding vectors to the graph isomorphism network to produce modified second embedding vectors. The system can perform a graph isomorphism evaluation on the modified first embedding vectors and the modified second embedding vectors to determine an amount of difference.

20 Claims, 10 Drawing Sheets

(56) References Cited

U.S. PATENT DOCUMENTS

2025/0245370 A1\* 7/2025 Sawal ................. G06F 21/6227
2025/0315356 A1\* 10/2025 Sawal .................. G06F 11/079

OTHER PUBLICATIONS

Fuhlbruck, et al. "The Weisfeiler-Leman Algorithm and Recognition of Graph Properties" [https://arxiv.org/abs/2005.08887], Jul. 30, 2020, 30 pages.

Kipf, et al. "Semi-Supervised Classification With Graph Convolutional Networks" [https://arxiv.org/pdf/1609.02907]. Feb. 22, 2017, 14 pages.

Hamilton, et al. [Inductive Representation Learning on Large Graphs] [https://cs.stanford.edu/people/jure/pubs/graphsage-nips17.pdf] 31st Conference on Neural Information Processing Systems (NIPS 2017), Long Beach, CA, USA, 2017, 19 pages.

Morris, et al. "Global Weisfeiler-Lehman Kernels" [https://arxiv.org/pdf/1703.02379v3] Sep. 22, 2017, 10 pages.

Xu, et al. "How Powerful Are Graph Neural Networks?" [https://arxiv.org/pdf/1810.00826], Feb. 22, 2019, published as a conference paper at ICLR 2019, 17 pages.

Kaissis, et al. "Secure, privacy-preserving and federated machine learning in medical imaging" Nature Machine Intelligence vol. 2, pp. 305-311 (2020), [https://www.nature.com/articles/s42256-020-0186-1].

Kumar, Rishabh. "How to train ML|DL models on encrypted data!" Medium. May 28, 2020. [https://medium.com/@rishabhkumar140999/how-to-train-ml-dl-models-on-encrypted-data-1005f3101f67] retrieved Oct. 3, 2024, 15 pages.

\* cited by examiner

100

COMPUTER SYSTEM 106

ACTUAL CONFIGURATIONS 112

COMMUNICATIONS NETWORK 104

COMPUTER 102

GRAPH EMBEDDINGS FOR DRIFT IDENTIFICATION COMPONENT 108

EXPECTED CONFIGURATIONS 110

300
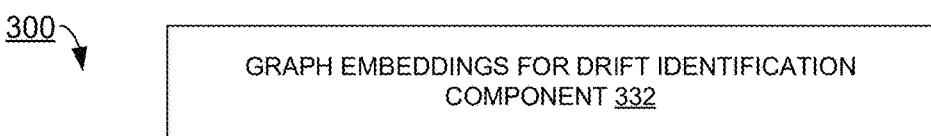
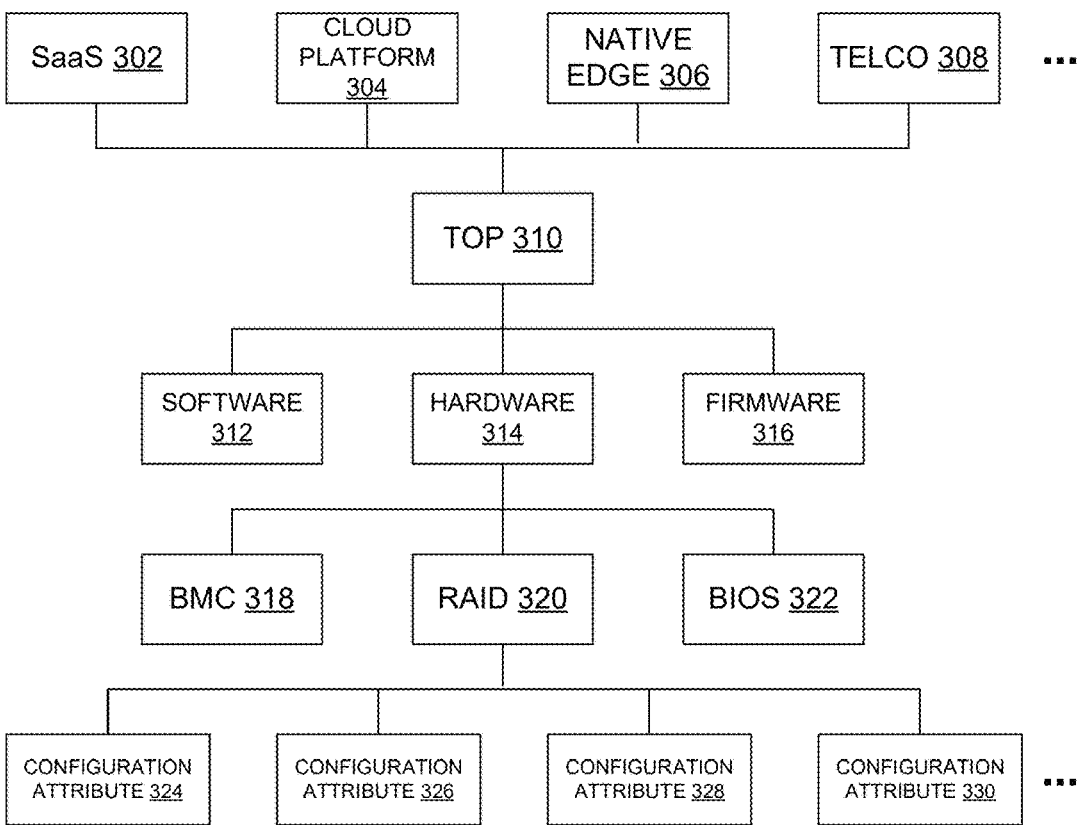
FIG. 3

400
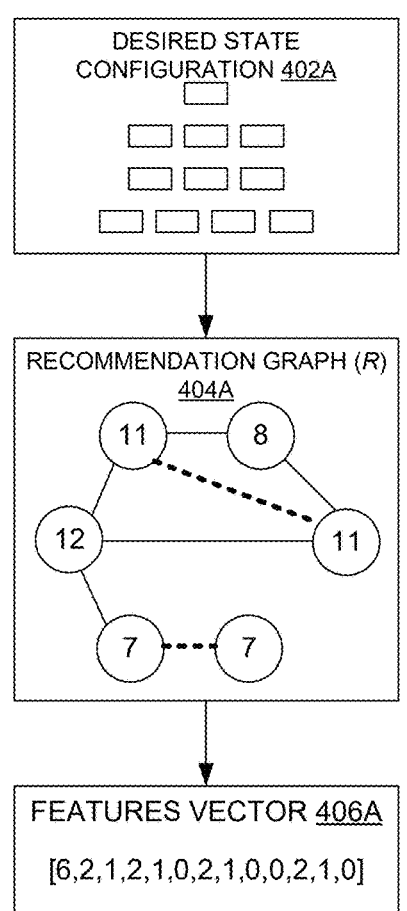
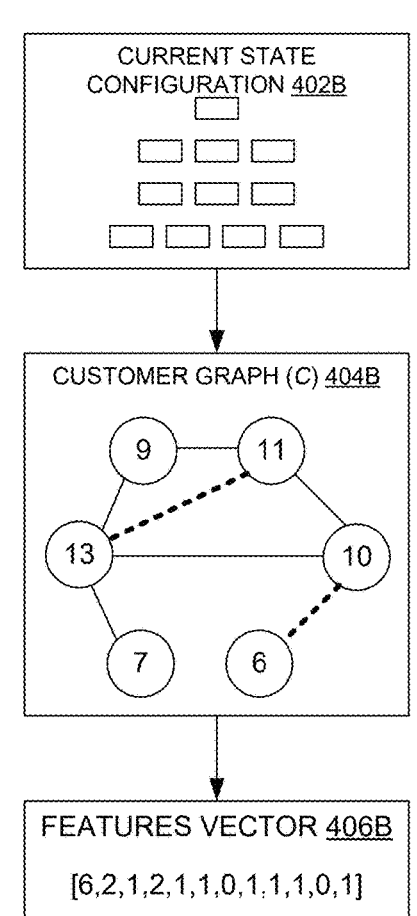
FIG. 4

500

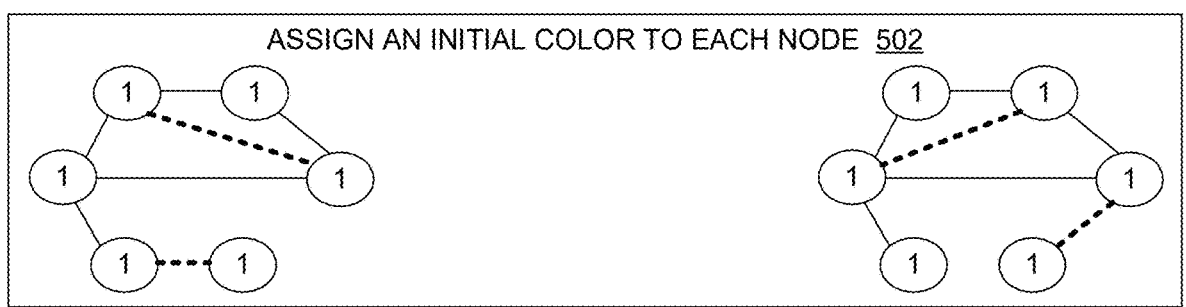

ASSIGN AN INITIAL COLOR TO EACH NODE  502

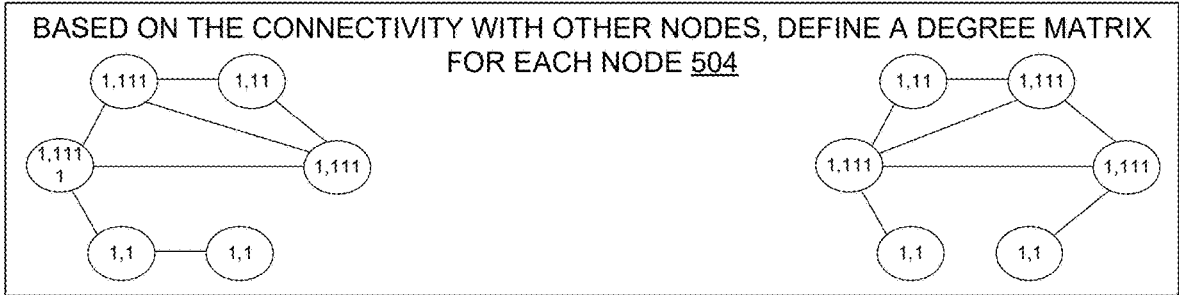

BASED ON THE CONNECTIVITY WITH OTHER NODES, DEFINE A DEGREE MATRIX FOR EACH NODE 504

DEFINE A HASH FUNCTION TO MAP DIFFERENT INPUTS TO DIFFERENT COLORS
506
(1,1 -> 2 / 1,11 -> 3 / 1,111 -> 4 / 1,1111 -> 5)

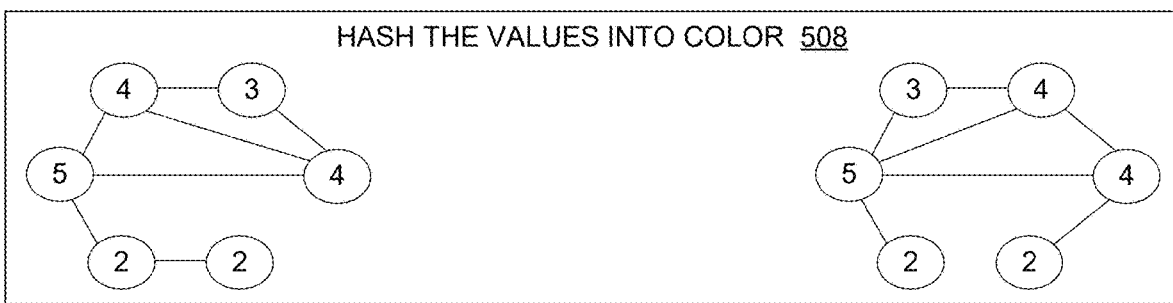

HASH THE VALUES INTO COLOR  508

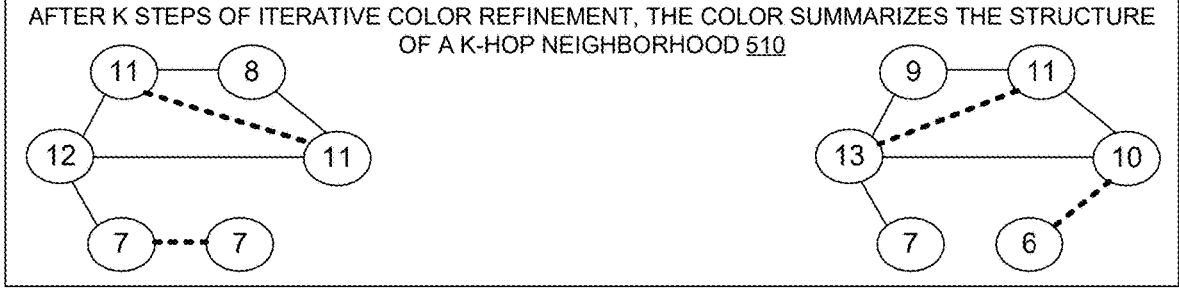

AFTER K STEPS OF ITERATIVE COLOR REFINEMENT, THE COLOR SUMMARIZES THE STRUCTURE OF A K-HOP NEIGHBORHOOD 510

ONCE COMPLETE, EXTRACT NODE COLOR OF THE GRAPH AS AN N-DIMENSIONAL VECTOR TO REPRESENT THE EMBEDDING 512

600
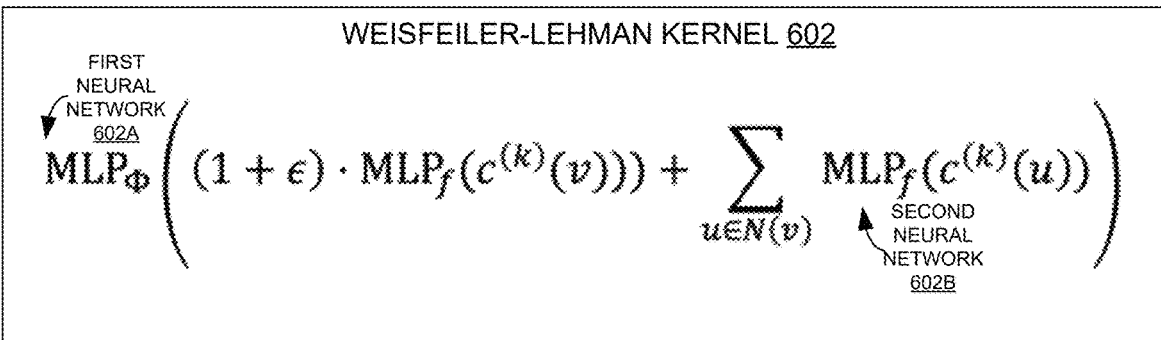
WEISFEILER-LEHMAN KERNEL 602
FIRST NEURAL NETWORK 602A
SECOND NEURAL NETWORK 602B
$$\text{MLP}_{\Phi}\left( (1 + \epsilon) \cdot \text{MLP}_f(c^{(k)}(v)) + \sum_{u \in N(v)} \text{MLP}_f(c^{(k)}(u)) \right)$$
where $\epsilon$ is a learnable scalar.
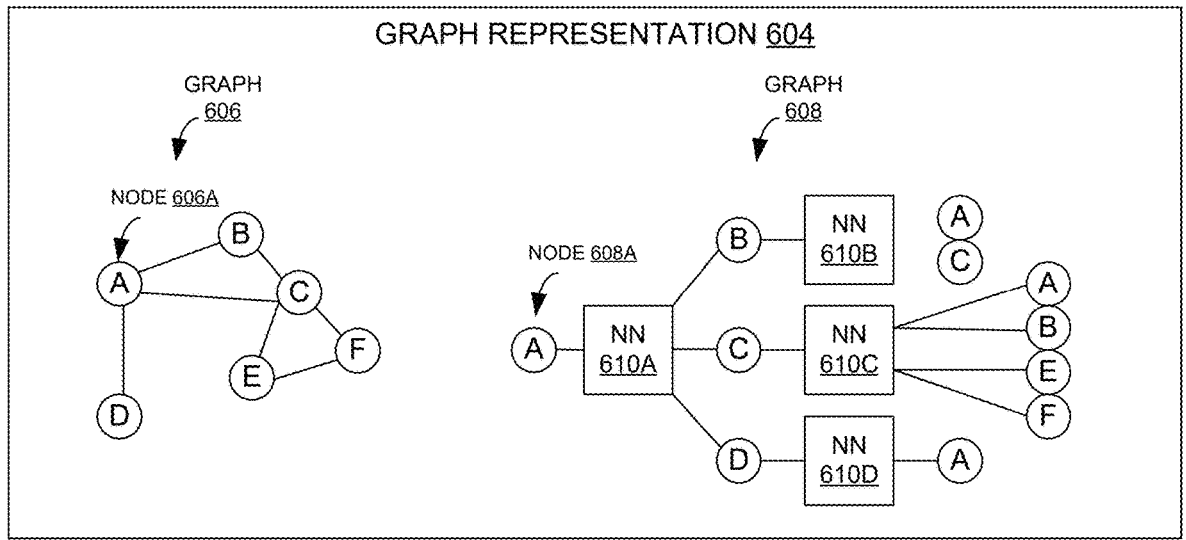
GRAPH REPRESENTATION 604
GRAPH 606
NODE 606A
GRAPH 608
NODE 608A
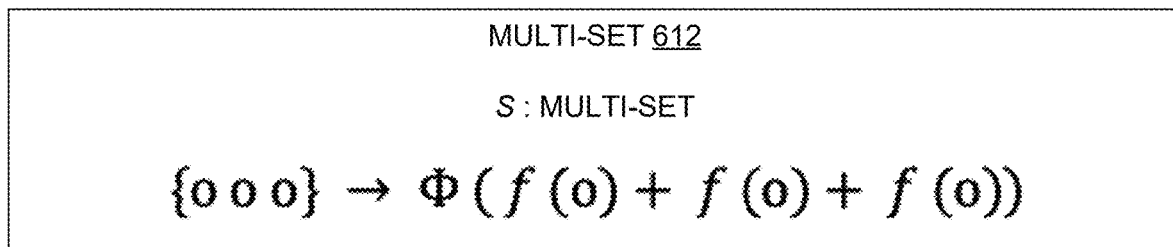
MULTI-SET 612
$S$ : MULTI-SET
$$\{o\ o\ o\} \rightarrow \Phi(f(o) + f(o) + f(o))$$
FIG. 6

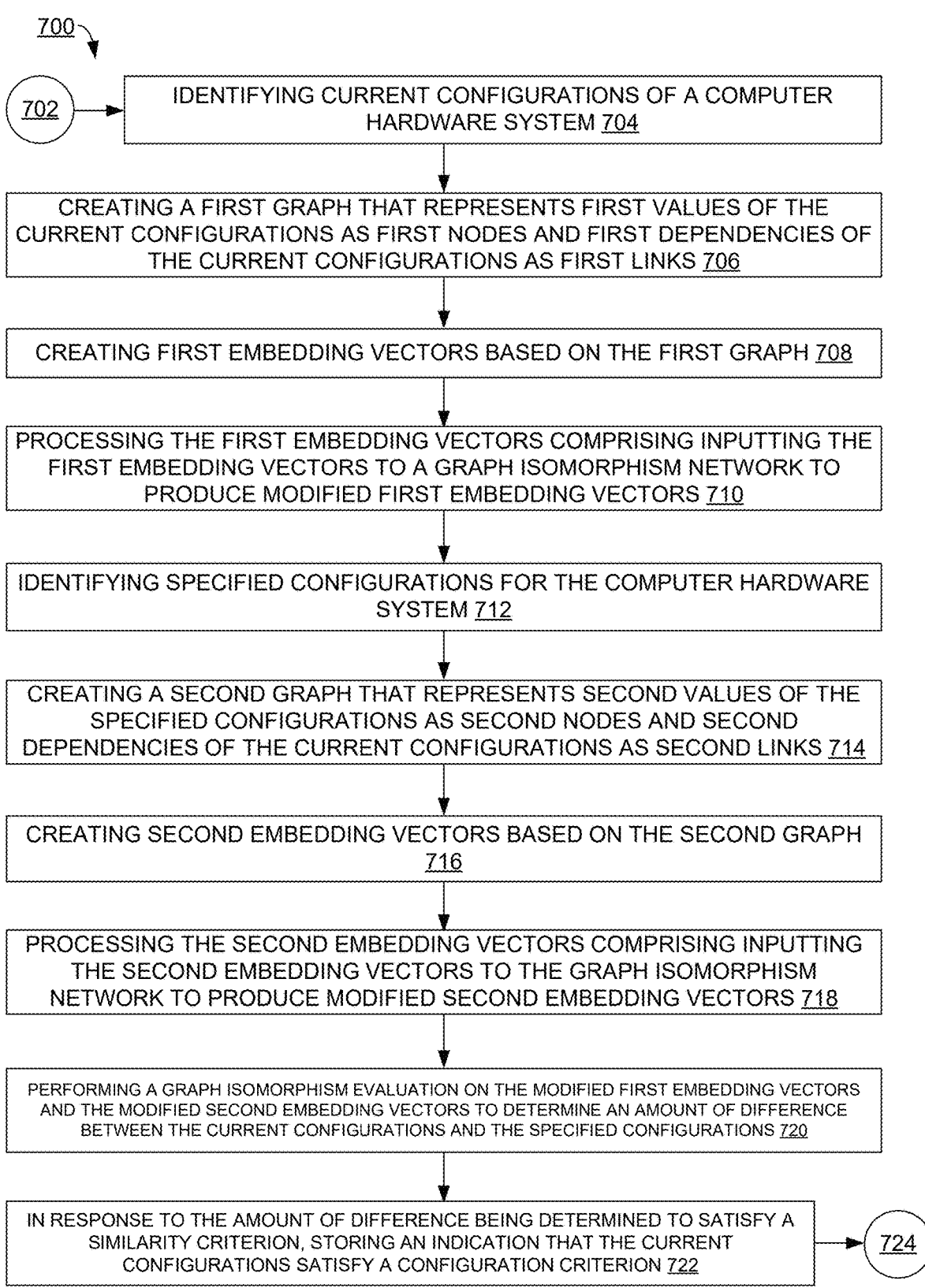

700

702 → IDENTIFYING CURRENT CONFIGURATIONS OF A COMPUTER HARDWARE SYSTEM 704

CREATING A FIRST GRAPH THAT REPRESENTS FIRST VALUES OF THE CURRENT CONFIGURATIONS AS FIRST NODES AND FIRST DEPENDENCIES OF THE CURRENT CONFIGURATIONS AS FIRST LINKS 706

CREATING FIRST EMBEDDING VECTORS BASED ON THE FIRST GRAPH 708

PROCESSING THE FIRST EMBEDDING VECTORS COMPRISING INPUTTING THE FIRST EMBEDDING VECTORS TO A GRAPH ISOMORPHISM NETWORK TO PRODUCE MODIFIED FIRST EMBEDDING VECTORS 710

IDENTIFYING SPECIFIED CONFIGURATIONS FOR THE COMPUTER HARDWARE SYSTEM 712

CREATING A SECOND GRAPH THAT REPRESENTS SECOND VALUES OF THE SPECIFIED CONFIGURATIONS AS SECOND NODES AND SECOND DEPENDENCIES OF THE CURRENT CONFIGURATIONS AS SECOND LINKS 714

CREATING SECOND EMBEDDING VECTORS BASED ON THE SECOND GRAPH 716

PROCESSING THE SECOND EMBEDDING VECTORS COMPRISING INPUTTING THE SECOND EMBEDDING VECTORS TO THE GRAPH ISOMORPHISM NETWORK TO PRODUCE MODIFIED SECOND EMBEDDING VECTORS 718

PERFORMING A GRAPH ISOMORPHISM EVALUATION ON THE MODIFIED FIRST EMBEDDING VECTORS AND THE MODIFIED SECOND EMBEDDING VECTORS TO DETERMINE AN AMOUNT OF DIFFERENCE BETWEEN THE CURRENT CONFIGURATIONS AND THE SPECIFIED CONFIGURATIONS 720

IN RESPONSE TO THE AMOUNT OF DIFFERENCE BEING DETERMINED TO SATISFY A SIMILARITY CRITERION, STORING AN INDICATION THAT THE CURRENT CONFIGURATIONS SATISFY A CONFIGURATION CRITERION 722 → 724

FIG. 7

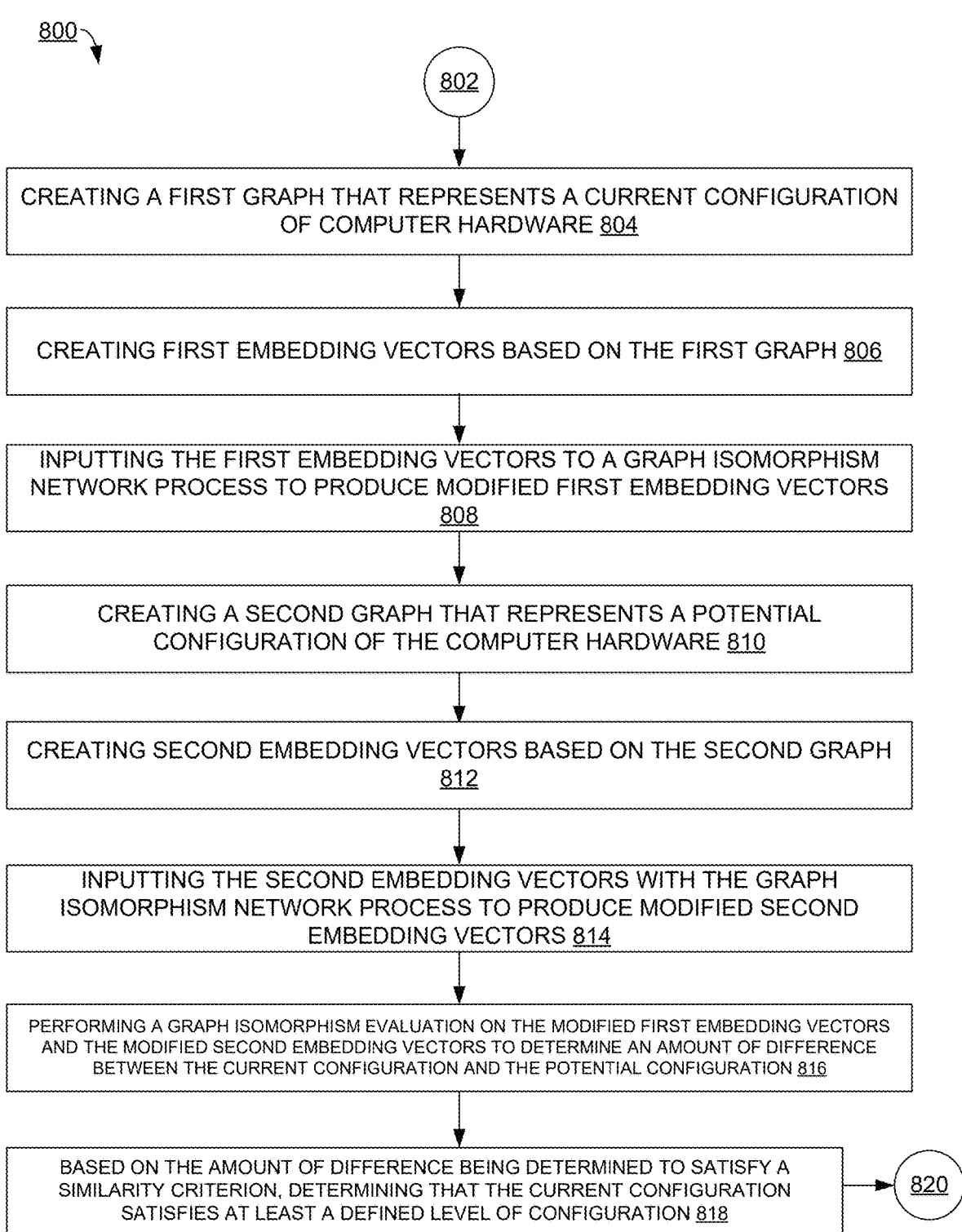

800

802

CREATING A FIRST GRAPH THAT REPRESENTS A CURRENT CONFIGURATION OF COMPUTER HARDWARE 804

CREATING FIRST EMBEDDING VECTORS BASED ON THE FIRST GRAPH 806

INPUTTING THE FIRST EMBEDDING VECTORS TO A GRAPH ISOMORPHISM NETWORK PROCESS TO PRODUCE MODIFIED FIRST EMBEDDING VECTORS 808

CREATING A SECOND GRAPH THAT REPRESENTS A POTENTIAL CONFIGURATION OF THE COMPUTER HARDWARE 810

CREATING SECOND EMBEDDING VECTORS BASED ON THE SECOND GRAPH 812

INPUTTING THE SECOND EMBEDDING VECTORS WITH THE GRAPH ISOMORPHISM NETWORK PROCESS TO PRODUCE MODIFIED SECOND EMBEDDING VECTORS 814

PERFORMING A GRAPH ISOMORPHISM EVALUATION ON THE MODIFIED FIRST EMBEDDING VECTORS AND THE MODIFIED SECOND EMBEDDING VECTORS TO DETERMINE AN AMOUNT OF DIFFERENCE BETWEEN THE CURRENT CONFIGURATION AND THE POTENTIAL CONFIGURATION 816

BASED ON THE AMOUNT OF DIFFERENCE BEING DETERMINED TO SATISFY A SIMILARITY CRITERION, DETERMINING THAT THE CURRENT CONFIGURATION SATISFIES AT LEAST A DEFINED LEVEL OF CONFIGURATION 818

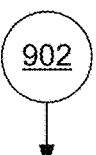

902

CREATING FIRST EMBEDDING VECTORS BASED ON A FIRST GRAPH THAT REPRESENTS A CURRENT CONFIGURATION OF COMPUTER HARDWARE 904

PROCESSING THE FIRST EMBEDDING VECTORS ACCORDING TO A GRAPH ISOMORPHISM NETWORK TO PRODUCE MODIFIED FIRST EMBEDDING VECTORS 906

CREATING SECOND EMBEDDING VECTORS BASED ON A SECOND GRAPH THAT REPRESENTS A DIFFERENT CONFIGURATION OF THE COMPUTER HARDWARE 908

PROCESSING THE SECOND EMBEDDING VECTORS ACCORDING TO THE GRAPH ISOMORPHISM NETWORK TO PRODUCE MODIFIED SECOND EMBEDDING VECTORS 910

APPLYING A GRAPH ISOMORPHISM EVALUATION TO THE MODIFIED FIRST EMBEDDING VECTORS AND THE MODIFIED SECOND EMBEDDING VECTORS COMPRISING DETERMINING AN AMOUNT OF DIFFERENCE BETWEEN THE CURRENT CONFIGURATION AND THE DIFFERENT CONFIGURATION 912

BASED ON THE AMOUNT OF DIFFERENCE BEING DETERMINED TO SATISFY A SIMILARITY CRITERION, DETERMINING THAT THE CURRENT CONFIGURATION SATISFIES A CONFIGURATION CONDITION 914

GRAPH EMBEDDINGS FOR DRIFT IDENTIFICATION

BACKGROUND

A computer system can have expected configurations, and the system's actual configurations can differ from the expected configurations.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can identify current configurations of a computer hardware system. The system can create a first graph that represents first values of the current configurations as first nodes and first dependencies of the current configurations as first links. The system can create first embedding vectors based on the first graph. The system can process the first embedding vectors comprising inputting the first embedding vectors to a graph isomorphism network to produce modified first embedding vectors. The system can identify specified configurations for the computer hardware system. The system can create a second graph that represents second values of the specified configurations as second nodes and second dependencies of the current configurations as second links. The system can create second embedding vectors based on the second graph. The system can process the second embedding vectors comprising inputting the second embedding vectors to the graph isomorphism network to produce modified second embedding vectors. The system can perform a graph isomorphism evaluation on the modified first embedding vectors and the modified second embedding vectors to determine an amount of difference between the current configurations and the specified configurations. The system can, in response to the amount of difference being determined to satisfy a similarity criterion, store an indication that the current configurations satisfy a configuration criterion.

An example method can comprise creating, by a system comprising at least one processor, a first graph that represents a current configuration of computer hardware. The method can further comprise creating, by the system, first embedding vectors based on the first graph. The method can further comprise inputting, by the system, the first embedding vectors to a graph isomorphism network process to produce modified first embedding vectors. The method can further comprise creating, by the system, a second graph that represents a potential configuration of the computer hardware. The method can further comprise creating, by the system, second embedding vectors based on the second graph. The method can further comprise inputting, by the system, the second embedding vectors with the graph isomorphism network process to produce modified second embedding vectors. The method can further comprise performing, by the system, a graph isomorphism evaluation on the modified first embedding vectors and the modified second embedding vectors to determine an amount of difference between the current configuration and the potential configuration. The method can further comprise, based on the amount of difference being determined to satisfy a similarity criterion, determining, by the system, that the current configuration satisfies at least a defined level of configuration.

An example non-transitory computer-readable medium can comprise instructions that, in response to execution, cause a system comprising a processor to perform operations. These operations can comprise creating first embedding vectors based on a first graph that represents a current configuration of computer hardware. These operations can further comprise processing the first embedding vectors according to a graph isomorphism network to produce modified first embedding vectors. These operations can further comprise creating second embedding vectors based on a second graph that represents a different configuration of the computer hardware. These operations can further comprise processing the second embedding vectors according to the graph isomorphism network to produce modified second embedding vectors. These operations can further comprise applying a graph isomorphism evaluation to the modified first embedding vectors and the modified second embedding vectors comprising determining an amount of difference between the current configuration and the different configuration. These operations can further comprise, based on the amount of difference being determined to satisfy a similarity criterion, determining that the current configuration satisfies a configuration condition.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 3 illustrates another example system architecture that can facilitate graph embeddings for drift identification, in accordance with an embodiment of this disclosure;

FIG. 4 illustrates an example implementation of graph embeddings for drift identification, in accordance with an embodiment of this disclosure;

FIG. 5 illustrates an example implementation of graph embeddings for drift identification, in accordance with an embodiment of this disclosure;

FIG. 6 illustrates an example implementation of graph embeddings for drift identification, in accordance with an embodiment of this disclosure;

FIG. 7 illustrates an example process flow that can facilitate graph embeddings for drift identification, in accordance with an embodiment of this disclosure;

FIG. 8 illustrates another example process flow that can facilitate graph embeddings for drift identification, in accordance with an embodiment of this disclosure;

FIG. 9 illustrates another example process flow that can facilitate graph embeddings for drift identification, in accordance with an embodiment of this disclosure;

DETAILED DESCRIPTION

Overview

Figure 1:
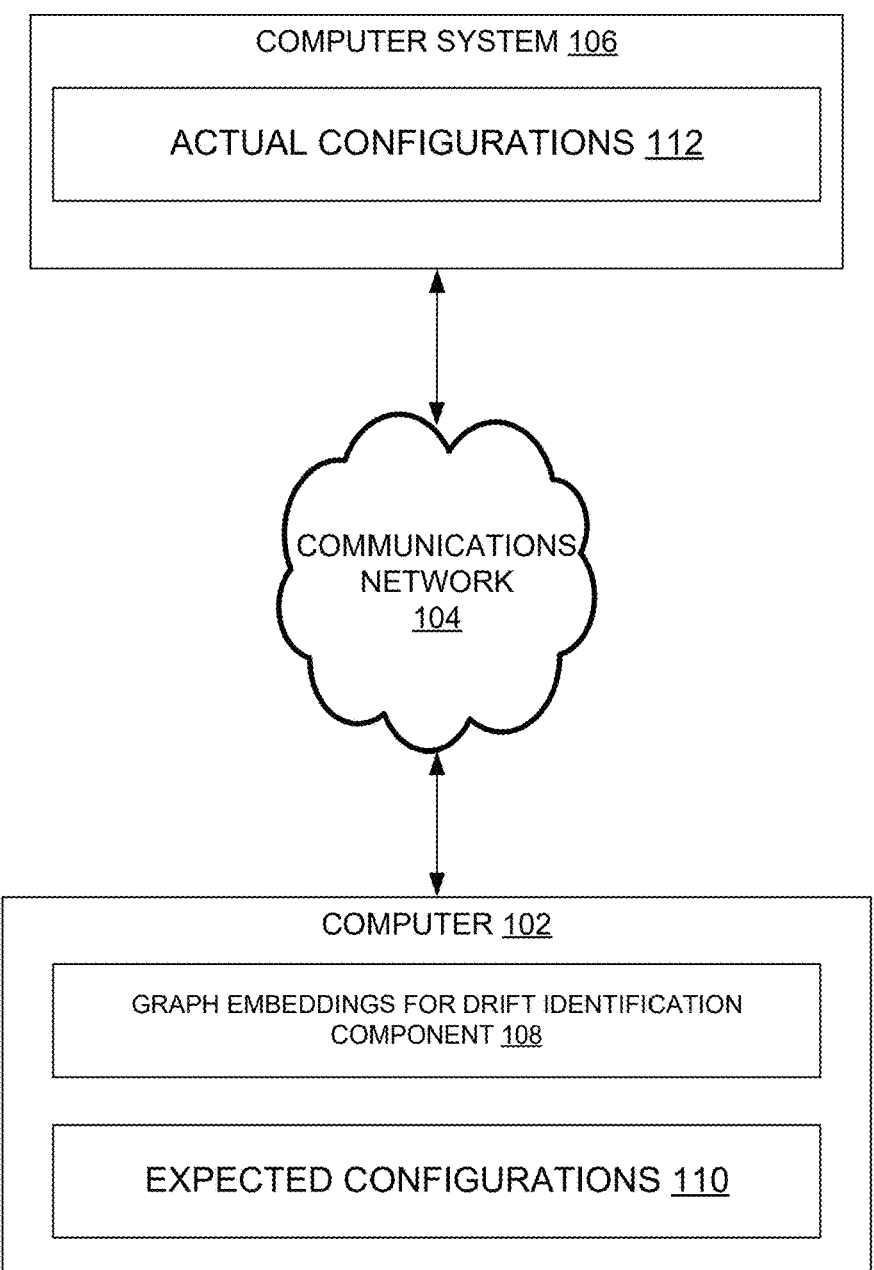
FIG. 1 illustrates an example system architecture that can facilitate graph embeddings for drift identification, in accordance with an embodiment of this disclosure.

Bare Metal as a Service (BMaaS) can comprise a service model where physical information technology (IT) infrastructure is deployed at a user's data center and/or colocations. In a BMaaS solution, aspects of the physical IT infrastructure such as hardware break-fix, lifecycle management, maintenance, expansion, etc., are handled by a service provider on behalf of the user. In contrast, activities such as active management can be performed by the user. This can be a policy-driven state-based active management model intended to be the single executor of intent for hardware endpoints.

Drift detection in this context can refer to a system's ability to reconcile a current state of a given endpoint to a desired state of that endpoint. That is, this can be an ongoing loop of what the endpoint configuration is versus what is desired. Drift detection can become problematic at scale, both horizontally as well as vertically. Horizontally, a problem can lie in the sheer number of endpoints under management (which can be hundreds of thousands to millions) paired with the vertical scale of growing data points per endpoint. Determining specific differences between the current and desired states can be a computationally significant task. An outward scale of endpoints and an upward scale of data points per endpoint can lead to a need for an efficient way to isolate the components of the endpoint into more manageable pieces so that the specific value or values of change/drift can be quickly resolved.

Specifically, the problem to resolve can be summarized as:

Given a specific product/release, there are a set of configuration variables with some relationship among them.

The product/release can have certain recommended configuration values, and there is a dependency relationship among such values.

Users who use the product/release can edit configuration values to fit with their needs.

Scalability: Since a product/release can continuously evolve with new features or improvements, there can be a need for an efficient way to detect config drifting also due to product/release changes. That is, there can be a need for a capability to compare multiple versions of a graph (of a state configuration) and recognize their similarity and differences.

This can imply that:

The number of nodes in the graphs might not be the same;

The ordering of the nodes might not be consistent with a unique identifier (ID);

There can be a need to overcome a scalability bottleneck by comparing graph embeddings to identify differences efficiently.

Differences between prior approaches and the present techniques can be as follows. A representation method under prior approaches can involve configuration identified as a set of variables, and a syntactic comparison performed to identify drift. This prior approach can fail when the configuration is encrypted. With the present techniques, configuration can be represented as a graph. A node embedding can be used to represent the node in the graph such that similarity between the two graphs can be calculated as a graph isomorphism problem. A dependency can be explicitly recited among configuration variables at two levels of an abstraction in the graph.

Config changes detection can be handled as follows. Prior approaches can detect specific undesired config values by heuristic/rules. It can be that the technique must be designed/trained based on desired values, such as:

Text-based differencing (diff)

Hash-tree-based diff detection

Config hash at the root level

ETag—hypertext transfer protocol (HTTP) resource versioning

With the present techniques, the detection technique can be implemented as a graph comparison. If the user configuration values as nodes are not in the recommendation graph, then it can be determined that drift occurred. This can capture dependencies among several config values in the two graphs. The present techniques can offer a generalized and scalable solution for representing and detecting any kind of undesired config values. The present techniques can be capable of explicitly representing a dependency among different config values and detecting violations of such constraints. The present techniques can be capable of continuously evolving. The interactions among variables can be captured by domain experts as links in the graph, at a higher abstraction level as a dependency map among variables, and at a lower abstraction level as connected values as links. It can be that, when new variables are added, existing variables can stay.

There can be challenges with prior approaches. It can be that, due to specialized training data and processes, prior techniques are neither generalized nor scalable. With prior techniques, it can be difficult to explicitly represent a dependency among config values, and detecting violation of such constraint can require another level of special training and data. Prior approaches can be static/unable to continuously evolve. That is, when there are new variables added, it can be that all the training data and processes must be re-performed and evaluated. Reusing partial historical training data Focus can differ between prior approaches and the present techniques. It can be that prior approaches only compare two graphs that represent the configurations for the same product/release—one is the recommendation configuration, and the other that is the user's sensitive configuration that is encrypted. In contrast, with the present techniques, scalability and efficiency can be achieved by comparing configuration graphs among multiple products/releases together.

There are shortcomings with prior approaches. It can be that prior approaches only can compare configurations of the same product/release. It can be that, for each product/release, there needs to be a special implementation of Weisfeiler-Lehman kernel technique to follow the same order of nodes to generate color refinement sequences as the embeddings. As a result, it can be that prior approaches are not able to be deployed in large scale with efficient execution.

The term "color" is used herein to refer to an approach associated with a Weisfeiler-Lehman kernel technique. "Color" can more generally involve labeling nodes of a graph, such as with numbers or letters. The figures here are presented in black-and-white. In the figures, the color concepts are generally illustrated with different numerical or alphabetical labels.

The present techniques can offer advantages relative to prior approaches. GNN-based embeddings can include a node's self-features (e.g., variable names/values) and aggregated neighbors' embeddings, which can handle different number of nodes and non-static node ID/orderings. According to the present techniques, a GIN model can be chosen to add a second layer of a NN to handle multi-set situations, and the GNN can uniquely identify nodes.

With respect to graph modeling, the present techniques can be implemented to model dependencies as relations among configuration values, which can be resolved with a graph isomorphism technique. That is, dependencies can be explicitly modeled in graphs. In contrast, prior approaches can hide these dependencies behind a configuration process as human knowledge.

Example Architectures and Implementations

FIG. 1 illustrates an example system architecture 100 that can facilitate graph embeddings for drift identification, in accordance with an embodiment of this disclosure.

System architecture 100 comprises computer 102, communications network 104, and computer system 106. Computer 102 comprises graph embeddings for drift identification component 108 and expected configurations 110. Computer system 106 comprises actual configurations 112.

Figure 10:
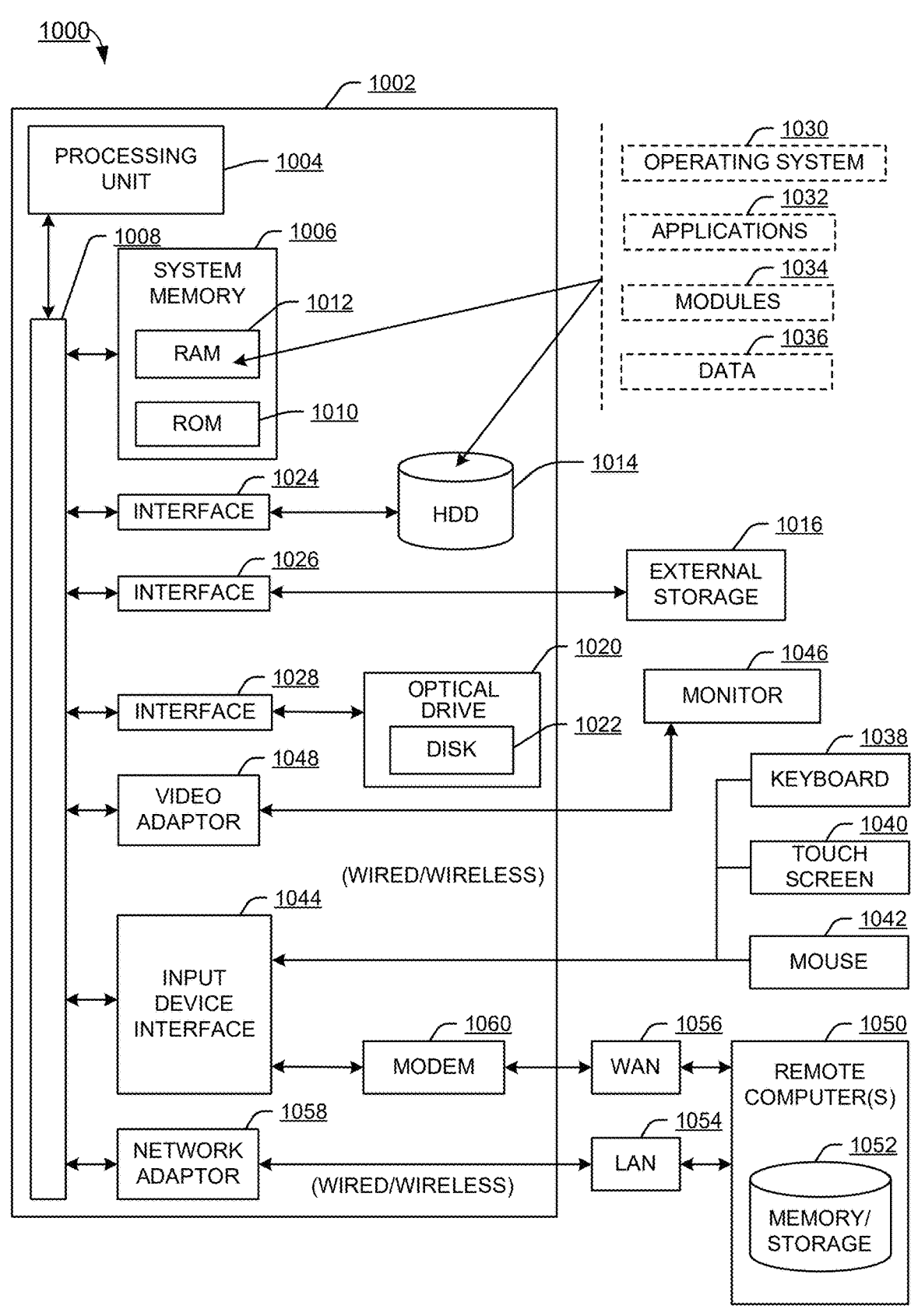
FIG. 10 illustrates an example block diagram of a computer operable to execute an embodiment of this disclosure.

Each of computer 102 and/or computer system 106 can be implemented with part(s) of computing environment 1000 of FIG. 10. Communications network 104 can comprise a computer communications network, such as the Internet, or an isolated private computer communications network.

Graph embeddings for drift identification component 108 can facilitate determining whether computer system 106 has experienced drift in its configurations. That is, graph embeddings for drift identification component 108 can determine whether, and to what degree expected configurations 110 for computer system 106 differ from actual configurations 112 of computer system 106.

In some examples, graph embeddings for drift identification component 108 can implement part(s) of the process flows of FIGS. 7-9 to facilitate graph embeddings for drift identification.

It can be appreciated that system architecture 100 is one example system architecture for graph embeddings for drift identification, and that there can be other system architectures that facilitate graph embeddings for drift identification.

Figure 2:
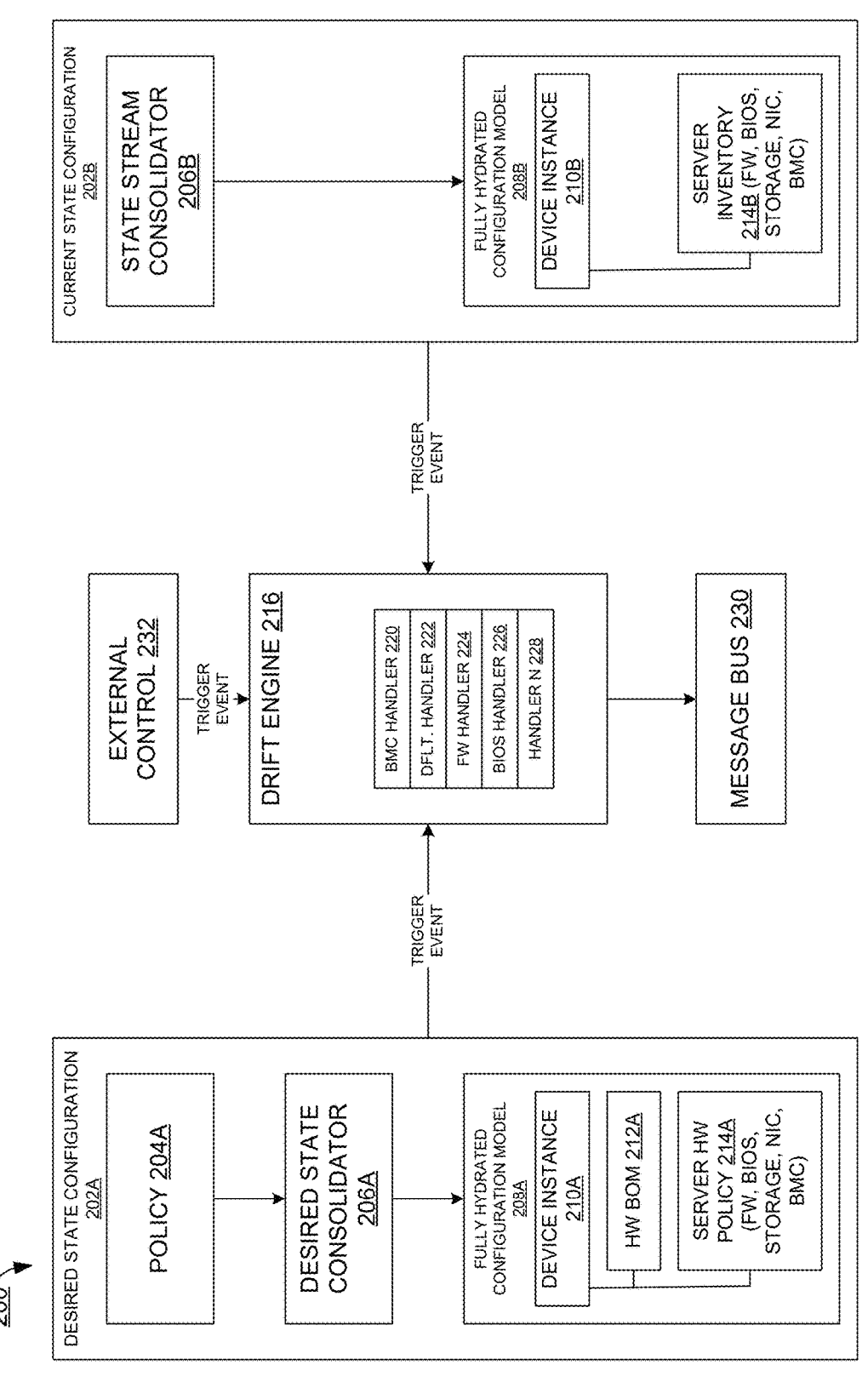
FIG. 2 illustrates another example system architecture that can facilitate graph embeddings for drift identification, in accordance with an embodiment of this disclosure.

FIG. 2 illustrates another example system architecture 200 that can facilitate graph embeddings for drift identification, in accordance with an embodiment of this disclosure. In some examples, part(s) of system architecture 200 can be implemented by part(s) of system architecture 100 of FIG. 1 to facilitate graph embeddings for drift identification.

System architecture 200 comprises desired state configuration 202A, policy 204A, desired state consolidator 206A, fully hydrated configuration model 208A, device instance 210A, hardware (HW) bill of materials (BOM) 212A, server HW policy 214A (firmware (FW), basic input output system (BIOS), storage, network interface card (NIC), baseboard management controller (BMC)), current state configuration 202B, state stream consolidator 206B, fully hydrated configuration model 208B, device instance 210B, server inventory 214B (FW, BIOS, storage, NIC, BMC), drift engine 216, BMC handler 220, default handler 222, FW handler 224, BIOS handler 226, handler N 228, message bus 230, and trigger event 232.

Drift engine 216 can compare desired state configuration 202A with current state configuration 202B to determine whether current state configuration 202B has drifted from desired state configuration 202A more than is desired. Drift engine 216 can output a message that indicates this on message bus 230. In some examples, this message can comprise an indication that current state configuration 202B is acceptable. In other examples, this message can comprise raising an alert that current state configuration 202B is unacceptable.

FIG. 3 illustrates another example system architecture 300 that can facilitate graph embeddings for drift identification, in accordance with an embodiment of this disclosure. In some examples, part(s) of system architecture 300 can be implemented by part(s) of system architecture 100 of FIG. 1 to facilitate graph embeddings for drift identification.

System architecture 300 comprises software-as-a-service (SaaS) 302, cloud platform 304, native edge 306, telco 308, top 310, software 312, hardware 314, firmware 316, BMC 318, redundant array of inexpensive disks (RAID) 320, BIOS 322, configuration attribute 324, configuration attribute 326, configuration attribute 328, configuration attribute 330, and graph embeddings for drift identification component 332 (which can be similar to graph embeddings for drift identification component 108 of FIG. 1).

System architecture 300 can generally comprise a current state configuration (which can be similar to current state configuration 202B of FIG. 2). Graph embeddings for drift identification component 332 can analyze this state configuration to determine a level of drift from a desired state configuration (which can be similar to desired state configuration 202A of FIG. 2).

FIG. 4 illustrates an example 400 implementation of graph embeddings for drift identification, in accordance with an embodiment of this disclosure. In some examples, part(s) of example 400 can be implemented by part(s) of system architecture 100 of FIG. 1 to facilitate graph embeddings for drift identification.

Example 400 comprises desired state configuration 402A, recommendation graph (R) 404A, features vector 406A, current state configuration 402B, customer graph (C) 404B, and features vector 406B.

In general, desired state configuration 402A can be used to create recommendation graph (R) 404A, which can be used to create features vector 406A. Likewise, current state configuration 402B can be used to create customer graph (C) 404B, which can be used to create features vector 406B.

Then, features vector 406A and features vector 406B can be compared to determine an amount of drift between desired state configuration 402A and current state configuration 402B.

Recommendation graph (R) 404A and customer graph (C) 404B can have different edges, which are indicated by bolded and dashed lines.

In FIG. 4, a color can be represented as a number in a node, with color refinement ending with color 13. Between desired state configuration 402A and current state configuration 402B, differences can be seen, which can be differences of color assignment, and can be traced back to node values.

The present techniques can be implemented to facilitate a solution to the problems identified above. In some examples, the present techniques can be implemented to facilitate modeling variables as a configuration hierarchy generalized as a graph to incorporate dependencies among them. The variables can be transformed into embeddings such that an objective function of comparing two or more graphs can be achieved. In contrast to a popular criterion in prior approaches of choosing features such as node degree, node centrality, cluster efficiency, or graphlets for the variables under consideration, here embeddings can be selected that can help solve a graph isomorphism problem. In the example of FIG. 4, there are customer config graph C and recommended graph R. If C is a sub-graph of R, then it can be that no drifting is detected. Otherwise, there can be a desire to know which value nodes and associated link(s) are the ones that drifted away. In some examples, a graph isomorphism network (GIN) can be implemented to enhance a Weisfeiler-Lehman kernel to overcome a limitation with the latter regarding strong neighbor aggregation functions.

The present techniques can be implemented to break a problem into more manageable pieces that are suitable for a specific type of integrity check.

It can be that differences in current stateside data points (represented in a hierarchical tree) should produce the same hash as the desired state. When a difference occurs, the tree can be walked (that is, programmatically evaluated) to determine which child or children are outside of the desired state.

The two graphs R and C can represent a lower abstraction level relationship among values. The different links can be highlighted as bolded dashed lines.

FIG. 5 illustrates an example 500 implementation of graph embeddings for drift identification, in accordance with an embodiment of this disclosure. In some examples, part(s) of example 500 can be implemented by part(s) of system architecture 100 of FIG. 1 to facilitate graph embeddings for drift identification.

A Weisfeiler-Lehman kernel technique can comprise the following steps as shown in FIG. 5.

1. Assign an initial color $c^{(0)}$ (v) to each node v 502. In 502, color refinement can start with color 1.
2. Based on the connectivity with other nodes, define a degree matrix for each node 504.
3. Define a hash function to map different inputs to different colors 506.
4. Hash the values into color by: $c^{(0)}$ (v)=HASH ($c^{(k)}$ (v), $\{c^{(k)}$ (u)$\}$u∈N(v))508.
5. After K steps of iterative color refinement, $c^{(k)}$ (v) summarizes the structure of a K-hop neighborhood 510. In 510, color refinement can end with color 13, and a drift between the two graphs can be seen in the different nodes and edges.
6. Once complete, extract node color of the graph as an n-dimensional vector to represent the embedding 512.

To generate the graph embeddings, the following graph properties can be considered to determine if two graphs are isomorphic:

They have the same number of vertices and edges.

They have the same degree sequence (up to reordering).

There exists a matching between their vertices such that two vertices are connected by an edge in one graph if and only if corresponding vertices are connected by an edge in the other graph.

They have the same invariants, such as the number of components, diameter, etc.

Now, the two embeddings can be compared to identify the differences between them.

FIG. 6 illustrates an example 600 implementation of graph embeddings for drift identification, in accordance with an embodiment of this disclosure. In some examples, part(s) of example 600 can be implemented by part(s) of system architecture 100 of FIG. 1 to facilitate graph embeddings for drift identification.

Example 600 comprises Weisfeiler-Lehman kernel 602, first neural network 602A, second neural network 602B, graph representation 604, graph 606, node 606A, graph 608, node 608A, neural network 610A, neural network 610B, neural network 610C, neural network 610D, and multi-set 612.

Graph 606 is an input graph, and node 606A can be considered to be a target node.

In some examples, different GNN models can use different neural networks (NNs) in neural network 610A, neural network 610B, neural network 610C, and neural network 610D.

As shown, the Weisfeiler-Lehman kernel can generate graph embedding to help compare different configurations. Then, it can be that certain limitations are to be overcome to solve the problem:

1. In comparing graphs from different products/releases, the number of nodes can differ, and ordering may change. A GIN can utilize a neural network (NN) to aggregate neighbors, thus satisfying this limitation. A graph neural network (GNN) can introduce a NN for each node to aggregate its neighbors' embeddings into its embedding.
2. To further define colors, it can be that the hash function available in a Weisfeiler-Lehman kernel is not sufficient. A GIN can use a second neural network to model the injective HASH function: $c^{(k+1)}$ (v)=HASH ($c^{(k)}$ (v), $\{c^{(k)}$ (u)$\}$u∈N(v)).

In FIG. 6, a NN is added to capture neighbor (B, C, D) embeddings and combine them with A's embedding to generate final embedding for node A. Without a consistent ID of each node, to distinguish all neighbor nodes uniquely, a GNN can iteratively include a further hub away (that is, a neighbor's neighbors, and so on) until uniqueness is identified.

However, it can be that a GNN that uses mean-pool (such as in a graph convolutional network (GCN) or max-pool for neighbors' embedding cannot distinguish duplicated embedding values. For example, it can be that the differences between node A with 2 neighbors vs node A with 3 neighbors (which has same embeddings) cannot be determined in this scenario, which can be a multi-set (e.g., multi-set 612). A GIN can overcome this problem by adding a second NN to sum neighbors' embeddings, as illustrated in Weisfeiler-Lehman kernel 602 and graph representation 604.

Example Process Flows

FIG. 7 illustrates an example process flow 700 for graph embeddings for drift identification, in accordance with an embodiment of this disclosure. In some examples, one or more embodiments of process flow 700 can be implemented by system architecture 100 of FIG. 1, or computing environment 1000 of FIG. 10.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 800 of FIG. 8 and/or process flow 900 of FIG. 9.

Process flow 700 begins with 702, and moves to operation 704.

Operation 704 depicts identifying current configurations of a computer hardware system. Using the example of FIG. 1, this can be actual configurations 112 of computer system 106.

In some examples, the computer hardware system comprises a bare metal as a service system, wherein a first entity associated with the system performs management of physical information technology infrastructure of the computer hardware system, and wherein a second entity is a user of the computer hardware system and performs active management of the computer hardware system. That is, the present techniques can be implemented as part of a BMaaS implementation.

In some examples, the current configurations of the computer hardware system comprise configuration variables for a product of the computer hardware system or a release of the computer hardware system. In some examples, the current configurations of the computer hardware system comprise identifications of relationships between the configuration variables. In some examples, the specified configurations of the computer hardware system comprise recommended configuration variables for a product of the computer hardware system or a release of the computer hardware system. In some examples, the specified configurations of the computer hardware system comprise identifications of relationships between the recommended configuration variables. That is, for a specific product or release, there can be a set of configuration variables with a relationship between them.

In some examples, a user account that is configured to utilize resources of the computer hardware system is configured to edit the recommended configuration variables to form recommended values to user-specified values. That is, users of the computer system can be able to edit configuration values to fit their wants.

After operation 704, process flow 700 moves to operation 706.

Operation 706 depicts creating a first graph that represents first values of the current configurations as first nodes and first dependencies of the current configurations as first links. In some examples, this can be implemented in a similar manner as depicted in FIGS. 4-6.

After operation 706, process flow 700 moves to operation 708.

Operation 708 depicts creating first embedding vectors based on the first graph. In some examples, this can be implemented in a similar manner as depicted in FIGS. 4-6.

After operation 708, process flow 700 moves to operation 710.

Operation 710 depicts processing the first embedding vectors comprising inputting the first embedding vectors to a graph isomorphism network to produce modified first embedding vectors. In some examples, this can be implemented in a similar manner as depicted in FIGS. 4-6.

After operation 710, process flow 700 moves to operation 712.

Operation 712 depicts identifying specified configurations for the computer hardware system. Continuing with the example of FIG. 1, this can be expected configurations 110 of computer system 106.

After operation 712, process flow 700 moves to operation 714.

Operation 714 depicts creating a second graph that represents second values of the specified configurations as second nodes and second dependencies of the current configurations as second links. In some examples, this can be implemented in a similar manner as depicted in FIGS. 4-6.

After operation 714, process flow 700 moves to operation 716.

Operation 716 depicts creating second embedding vectors based on the second graph. In some examples, this can be implemented in a similar manner as depicted in FIGS. 4-6.

After operation 716, process flow 700 moves to operation 718.

Operation 718 depicts processing the second embedding vectors comprising inputting the second embedding vectors to the graph isomorphism network to produce modified second embedding vectors. In some examples, this can be implemented in a similar manner as depicted in FIGS. 4-6.

After operation 718, process flow 700 moves to operation 720.

Operation 720 depicts performing a graph isomorphism evaluation on the modified first embedding vectors and the modified second embedding vectors to determine an amount of difference between the current configurations and the specified configurations. In some examples, this can be implemented in a similar manner as depicted in FIGS. 4-6. This difference can be considered to be an amount of drift between the actual configurations and the expected configurations.

After operation 720, process flow 700 moves to operation 722.

Operation 722 depicts, in response to the amount of difference being determined to satisfy a similarity criterion, storing an indication that the current configurations satisfy a configuration criterion. That is, where too much drift has been detected in the computer system, this can be identified, and stored (such as to alert an administrator of the computer system).

After operation 722, process flow 700 moves to 724, where process flow 700 ends.

FIG. 8 illustrates another example process flow 800 for graph embeddings for drift identification, in accordance with an embodiment of this disclosure. In some examples, one or more embodiments of process flow 800 can be implemented by system architecture 100 of FIG. 1, or computing environment 1000 of FIG. 10.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 700 of FIG. 7 and/or process flow 900 of FIG. 9.

Process flow 800 begins with 802, and moves to operation 804.

Operation 804 depicts creating a first graph that represents a current configuration of computer hardware. In some examples, operation 804 can be implemented in a similar manner as operations 704-706 of FIG. 7.

In some examples, the first graph comprises variables of the current configuration that are modeled as a configuration hierarchy and generalized in graph form. That is, variables of a configuration can be modeled as a configuration hierarchy that is generalized as a graph to incorporate the dependencies among them.

After operation 804, process flow 800 moves to operation 806.

Operation 806 depicts creating first embedding vectors based on the first graph. In some examples, operation 806 can be implemented in a similar manner as operation 708 of FIG. 7.

After operation 806, process flow 800 moves to operation 808.

Operation 808 depicts inputting the first embedding vectors to a graph isomorphism network process to produce modified first embedding vectors. In some examples, operation 808 can be implemented in a similar manner as operation 710 of FIG. 7. After operation 808, process flow 800 moves to operation 810.

Operation 810 depicts creating a second graph that represents a potential configuration of the computer hardware. In some examples, operation 810 can be implemented in a similar manner as operations 712-714 of FIG. 7.

In some examples, a first number of nodes of the first graph differs from a second number of nodes of the second graph. That is, the number of nodes in the graphs can differ.

In some examples, a first ordering of nodes of the first graph differs from a second ordering of nodes of the second graph. That is, an ordering of nodes can be inconsistent with a unique identifier (UID).

After operation 810, process flow 800 moves to operation 812.

Operation 812 depicts creating second embedding vectors based on the second graph.

After operation 812, process flow 800 moves to operation 814. In some examples, operation 812 can be implemented in a similar manner as operation 716 of FIG. 7.

Operation 814 depicts inputting the second embedding vectors with the graph isomorphism network process to produce modified second embedding vectors. In some examples, operation 814 can be implemented in a similar manner as operation 718 of FIG. 7.

After operation 814, process flow 800 moves to operation 816.

Operation 816 depicts performing a graph isomorphism evaluation on the modified first embedding vectors and the modified second embedding vectors to determine an amount of difference between the current configuration and the potential configuration. In some examples, operation 816 can be implemented in a similar manner as operation 720 of FIG. 7.

In some examples, at least part of the amount of difference between the current configuration and the potential configuration is based on a product or a release that has been updated relative to a first version of the product or a second version of the release identified by the potential configuration. That is, there can be configuration drifting also due to product/release changes, and the present techniques can facilitate comparing multiple versions of a graph and recognizing their similarity and differences.

In some examples, the amount of difference between the current configuration and the potential configuration is identified as no difference, and the first graph comprises a subgraph of the second graph. That is, where the actual configuration is a sub-graph of the desired configuration, then it can be that no drift is detected.

In some examples, the graph isomorphism evaluation comprises an evaluation based on a Weisfeiler Leman graph isomorphism test. That is, a GIN can be implemented to enhance a Weisfeiler-Lehman kernel, such as to overcome its expressive limitation with strong neighbor aggregation functions.

After operation 816, process flow 800 moves to operation 818.

Operation 818 depicts, based on the amount of difference being determined to satisfy a similarity criterion, determining that the current configuration satisfies at least a defined level of configuration. In some examples, operation 818 can be implemented in a similar manner as operation 722 of FIG. 7.

After operation 818, process flow 800 moves to 820, where process flow 800 ends.

FIG. 9 illustrates another example process flow 900 for graph embeddings for drift identification, in accordance with an embodiment of this disclosure. In some examples, one or more embodiments of process flow 900 can be implemented by system architecture 100 of FIG. 1, or computing environment 1000 of FIG. 10.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 700 of FIG. 7 and/or process flow 800 of FIG. 8.

Process flow 900 begins with 902, and moves to operation 904.

Operation 904 depicts creating first embedding vectors based on a first graph that represents a current configuration of computer hardware. In some examples, operation 904 can be implemented in a similar manner as operations 704-708 of FIG. 7.

After operation 904, process flow 900 moves to operation 906.

Operation 906 depicts processing the first embedding vectors according to a graph isomorphism network to produce modified first embedding vectors. In some examples, operation 906 can be implemented in a similar manner as operation 710 of FIG. 7.

After operation 906, process flow 900 moves to operation 908.

Operation 908 depicts creating second embedding vectors based on a second graph that represents a different configuration of the computer hardware. In some examples, operation 908 can be implemented in a similar manner as operations 712-716 of FIG. 7.

After operation 908, process flow 900 moves to operation 910.

Operation 910 depicts processing the second embedding vectors according to the graph isomorphism network to produce modified second embedding vectors. In some examples, operation 910 can be implemented in a similar manner as operation 718 of FIG. 7.

In some examples, processing the first embedding vectors or the second embedding vectors according to the graph isomorphism network comprises aggregating respective embeddings that correspond to respective neighbor nodes of the first graph or the second graph, respectively. In some examples, processing the first embedding vectors or the second embedding vectors according to the graph isomorphism network technique utilizing respective neural networks that correspond to respective nodes of the first graph or the second graph, respectively. That is, in comparing graphs from different products/releases, the number of nodes can differ, and ordering may change. A GIN can utilize a neural network to aggregate neighbors thus satisfying this limitation. A graph neural network can introduce a neural network for each node to aggregate its neighbors' embeddings into its embedding.

In some examples, processing the first embedding vectors or the second embedding vectors according to the graph isomorphism network comprises modeling an injective hash function using a neural network to define colors for the first graph or the second graph, respectively, and wherein applying the graph isomorphism evaluation comprises applying the graph isomorphism evaluation based on the colors. That is, a GIN can utilize a second neural network to model an injective hash function to define colors beyond what is done in a Weisfeiler-Lehman kernel.

In some examples, processing the first embedding vectors or the second embedding vectors according to the graph isomorphism network technique comprises utilizing a neural network that is configured to sum respective first embeddings of the first embedding vectors that correspond to respective first neighbor nodes of the first graph or sum respective second embeddings of the second embedding vectors that correspond to respective second neighbor nodes of the second graph, respectively. That is, a GIN can implement a neural network to sum neighbors' embeddings.

After operation 910, process flow 900 moves to operation 912.

Operation 912 depicts applying a graph isomorphism evaluation to the modified first embedding vectors and the modified second embedding vectors comprising determining an amount of difference between the current configuration and the different configuration. In some examples, operation 912 can be implemented in a similar manner as operation 720 of FIG. 7.

After operation 912, process flow 900 moves to operation 914.

Operation 914 depicts, based on the amount of difference being determined to satisfy a similarity criterion, determining that the current configuration satisfies a configuration condition. In some examples, operation 914 can be implemented in a similar manner as operation 722 of FIG. 7.

In some examples, determining the amount of difference between the current configuration and the different configuration comprises determining the amount of difference based on at least one of respective numbers of vertices and respective number of edges of the first graph and the second graph, respective degree sequences of the first graph and the second graph, respective degrees of matching of edge connections between vertices of the first graph and the second graph, or respective invariants of the first graph and the second graph.

After operation 914, process flow 900 moves to 916, where process flow 900 ends.

Example Operating Environment

In order to provide additional context for various embodiments described herein, FIG. 10 and the following discussion are intended to provide a brief, general description of a suitable computing environment 1000 in which the various embodiments of the embodiment described herein can be implemented.

For example, parts of computing environment 1000 can be used to implement one or more embodiments of computer 102 and/or computer system 106 of FIG. 1.

In some examples, computing environment 1000 can implement one or more embodiments of the process flows of FIGS. 6-9 to facilitate graph embeddings for drift identification.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per sc.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a nonvolatile storage such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/ storage device 1052. It will be appreciated that the network connections shown are examples, and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1016 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/ output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/ communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:

at least one processor; and at least one memory that stores executable instructions that, when executed by the at least one processor, facilitate performance of operations, comprising:

identifying current configurations of a computer hardware system;

creating a first graph that represents first values of the current configurations as first nodes and first dependencies of the current configurations as first links;

creating first embedding vectors based on the first graph;

processing the first embedding vectors comprising inputting the first embedding vectors to a graph isomorphism network to produce modified first embedding vectors;

identifying specified configurations for the computer hardware system;

creating a second graph that represents second values of the specified configurations as second nodes and second dependencies of the current configurations as second links;

creating second embedding vectors based on the second graph;

processing the second embedding vectors comprising inputting the second embedding vectors to the graph isomorphism network to produce modified second embedding vectors;

performing a graph isomorphism evaluation on the modified first embedding vectors and the modified second embedding vectors to determine an amount of difference between the current configurations and the specified configurations; and in response to the amount of difference being determined to satisfy a similarity criterion, storing an indication that the current configurations satisfy a configuration criterion.

2. The system of claim 1, wherein the computer hardware system comprises a bare metal as a service system, wherein a first entity associated with the system performs management of physical information technology infrastructure of the computer hardware system, and wherein a second entity is a user of the computer hardware system and performs active management of the computer hardware system.

3. The system of claim 1, wherein the current configurations of the computer hardware system comprise configuration variables for a product of the computer hardware system or a release of the computer hardware system.

4. The system of claim 3, wherein the current configurations of the computer hardware system comprise identifications of relationships between the configuration variables.

5. The system of claim 1, wherein the specified configurations of the computer hardware system comprise recommended configuration variables for a product of the computer hardware system or a release of the computer hardware system.

6. The system of claim 5, wherein the specified configurations of the computer hardware system comprise identifications of relationships between the recommended configuration variables.

7. The system of claim 5, wherein a user account that is configured to utilize resources of the computer hardware system is configured to edit the recommended configuration variables to form recommended values to user-specified values.

8. A method, comprising:

creating, by a system comprising at least one processor, a first graph that represents a current configuration of computer hardware;

creating, by the system, first embedding vectors based on the first graph;

inputting, by the system, the first embedding vectors to a graph isomorphism network process to produce modified first embedding vectors;

creating, by the system, a second graph that represents a potential configuration of the computer hardware;

creating, by the system, second embedding vectors based on the second graph;

inputting, by the system, the second embedding vectors with the graph isomorphism network process to produce modified second embedding vectors;

performing, by the system, a graph isomorphism evaluation on the modified first embedding vectors and the modified second embedding vectors to determine an amount of difference between the current configuration and the potential configuration; and based on the amount of difference being determined to satisfy a similarity criterion, determining, by the system, that the current configuration satisfies at least a defined level of configuration.

9. The method of claim 8, wherein at least part of the amount of difference between the current configuration and the potential configuration is based on a product or a release that has been updated relative to a first version of the product or a second version of the release identified by the potential configuration.

10. The method of claim 8, wherein a first number of nodes of the first graph differs from a second number of nodes of the second graph.

11. The method of claim 8, wherein a first ordering of nodes of the first graph differs from a second ordering of nodes of the second graph.

12. The method of claim 8, wherein the first graph comprises variables of the current configuration that are modeled as a configuration hierarchy and generalized in graph form.

13. The method of claim 8, wherein the amount of difference between the current configuration and the potential configuration is identified as no difference, and wherein the first graph comprises a subgraph of the second graph.

14. The method of claim 8, wherein the graph isomorphism evaluation comprises an evaluation based on a Weisfeiler Leman graph isomorphism test.

15. A non-transitory computer-readable medium comprising instructions that, in response to execution, cause a system comprising at least one processor to perform operations, comprising:

creating first embedding vectors based on a first graph that represents a current configuration of computer hardware;

processing the first embedding vectors according to a graph isomorphism network to produce modified first embedding vectors;

creating second embedding vectors based on a second graph that represents a different configuration of the computer hardware;

processing the second embedding vectors according to the graph isomorphism network to produce modified second embedding vectors;

applying a graph isomorphism evaluation to the modified first embedding vectors and the modified second embedding vectors comprising determining an amount of difference between the current configuration and the different configuration; and based on the amount of difference being determined to satisfy a similarity criterion, determining that the current configuration satisfies a configuration condition.

16. The non-transitory computer-readable medium of claim 15, wherein processing the first embedding vectors or the second embedding vectors according to the graph isomorphism network comprises aggregating respective embeddings that correspond to respective neighbor nodes of the first graph or the second graph, respectively.

17. The non-transitory computer-readable medium of claim 15, wherein processing the first embedding vectors or the second embedding vectors according to the graph isomorphism network technique utilizing respective neural networks that correspond to respective nodes of the first graph or the second graph, respectively.

18. The non-transitory computer-readable medium of claim 15, wherein processing the first embedding vectors or the second embedding vectors according to the graph isomorphism network comprises modeling an injective hash function using a neural network to define colors for the first graph or the second graph, respectively, and wherein applying the graph isomorphism evaluation comprises applying the graph isomorphism evaluation based on the colors.

19. The non-transitory computer-readable medium of claim 15, wherein processing the first embedding vectors or the second embedding vectors according to the graph isomorphism network technique comprises utilizing a neural network that is configured to sum respective first embeddings of the first embedding vectors that correspond to respective first neighbor nodes of the first graph or sum respective second embeddings of the second embedding vectors that correspond to respective second neighbor nodes of the second graph, respectively.

20. The non-transitory computer-readable medium of claim 15, wherein determining the amount of difference between the current configuration and the different configuration comprises determining the amount of difference based on at least one of respective numbers of vertices and respective number of edges of the first graph and the second graph, respective degree sequences of the first graph and the second graph, respective degrees of matching of edge connections between vertices of the first graph and the second graph, or respective invariants of the first graph and the second graph.

* * * * *